United States Patent [19]
Corvasce et al.

[11] Patent Number: 6,036,800
[45] Date of Patent: Mar. 14, 2000

[54] METHOD OF PREPARING TIRE WITH TREAD OF CAP/BASE CONSTRUCTION

[75] Inventors: Filomeno Gennaro Corvasce, Mertzig; Danielle Lucas, Welsdorf, both of Luxembourg; Jean-Paul Lambotte, Arlon, Belgium

[73] Assignee: The Goodyear Tire & Rubber Company, Akron, Ohio

[21] Appl. No.: 08/704,188

[22] Filed: Aug. 28, 1996

[51] Int. Cl.⁷ .............................. B29D 30/52; B60C 1/00; B60C 11/00
[52] U.S. Cl. .................. 156/123; 152/209.4; 152/209.5; 156/130.5
[58] Field of Search ........................... 152/209 R, 209 D, 152/209.4, 209.5, 905; 156/123, 128.1, 128.6, 130.5

[56] References Cited

U.S. PATENT DOCUMENTS

| | | | |
|---|---|---|---|
| 3,759,306 | 9/1973 | Greiher et al. | 152/374 |
| 3,830,275 | 8/1974 | Russell | 152/209 R |
| 3,842,883 | 10/1974 | Masson et al. | 152/354 |
| 4,675,349 | 6/1987 | Palombo et al. | 152/209 R |
| 5,162,395 | 11/1992 | Yamazaki et al. | 523/209 |
| 5,341,863 | 8/1994 | Sandstrom et al. | 152/209 R |
| 5,374,671 | 12/1994 | Corvasce et al. | 152/450 |
| 5,378,754 | 1/1995 | Bauer et al. | 152/209 R |
| 5,397,616 | 3/1995 | Aoki | 152/209 R |
| 5,513,683 | 5/1996 | Causa et al. | 152/209 R |
| 5,534,599 | 7/1996 | Sandstrom et al. | |
| 5,576,104 | 11/1996 | Causa et al. | 152/458 |
| 5,749,983 | 5/1998 | Yokoyama et al. | 152/209 R |

FOREIGN PATENT DOCUMENTS

| | | | |
|---|---|---|---|
| 3-7602 | 1/1991 | Japan | 152/209 R |

OTHER PUBLICATIONS

CRC Handbook of Chemistry and Physics, p. F–129, 1971.

*Primary Examiner*—Steven D. Maki
*Attorney, Agent, or Firm*—Henry C. Young, Jr.

[57] ABSTRACT

The invention relates to a tire with a rubber tread of a cap/base construction wherein the tread cap is designed to be ground-contacting, wherein the tread base underlies said tread cap, is not intended to be ground-contacting, and is a matrix composition composed of at least one elastomer where the matrix composition contains a dispersed micro inclusion made of a particulate, high molecular weight thermoplastic polymer and wherein the tread cap is composed of a blend of elastomers without such micro inclusion.

2 Claims, No Drawings

METHOD OF PREPARING TIRE WITH TREAD OF CAP/BASE CONSTRUCTION

FIELD

This invention relates to a tire with a rubber tread of a cap/base construction wherein the tread cap is designed to be ground-contacting, wherein the tread base underlies said tread cap and is composed of both a matrix composition of at least one elastomer and a micro inclusion within the elastomer matrix as a dispersion therein of at least one particulate thermoplastic polymer wherein and the tread cap is composed of a blend of elastomers without, or exclusive of, such particulate thermoplastic polymer micro inclusion.

BACKGROUND

Pneumatic rubber tires are conventionally prepared with a rubber tread which can be a blend of various elastomers.

Some tire treads are of a cap/base construction, with the tread cap designed to be ground-contacting with an outer surface of a lug/groove configuration, and with the tread base underlying and supporting the tread cap and positioned between the tread cap and the tire carcass. The tread base is not intended to be ground-contacting and, thus, not normally intended to have the same measure of tread properties as, for example, the tread cap typically desired properties of traction and treadwear.

While the tread cap, in a tread cap/base construction, is typically designed to be ground-contacting and, therefore, provide traction in combination with acceptable tread wear and rolling resistance, the underlying tread base is typically designed to fulfill an entirely different function and is not designed to be ground-contacting. In particular, it is typically desired that the tread base fulfill a function of transmitting multiaxial tread cap solicitations to the tire carcass, usually desirably with relatively low heat generation. The term "tread cap solicitations" is used herein to mean "the forces resulting from the tread cap working under forces such as compression, bending and/or shear", all of which can cause heat generation and, thus, cause a temperature build-up, and, also cause the forces to impact on the tire carcass itself. Such forces can result, for example, from the tire's cornering, braking and various handling activities, all of which can generate heat build-up within the tire tread.

Accordingly, a tire's rubber tread base component of a tread can fulfill very important functions as an interface between the tread cap and the tire carcass.

Desirable properties for the tread base include, for example, good rubber hysteresis so that it generates less heat from the stresses transmitted by the solicitations of the rubber tread cap, thereby reducing heat build-up in the tire carcass itself. The desirability of a tread base having good hysteresis to reduce heat build-up is well known to those skilled in such art.

Further, by nature of the tread base transmitting and absorbing portion of the stresses transmitted by the solicitations of the tread cap, the tire's overall handling, braking and/or cornering properties can be enhanced.

For example, during tire use operations such as tire handling, braking and/or cornering, the tread base transmits a degree of the stresses from the tire carcass to the tread and, conversely, from the tread to the carcass an optimum stress transmission is a balance between stress transmission and stress absorption by the tread base. It is desirable that such optimum balance be kept relatively constant during a substantial portion of the useful life of the tire, particularly as the tire ages, over a wide range of stress and strain intensity histories for the tire.

In one aspect, tread base rubber compositions may be provided, for example, with various amounts of various fillers intended to promote a relatively high stiffness and relatively low hysteresis, particularly as compared to the tire tread cap itself.

However, it remains to be desirable, for tire steering and cornering tire performance, to provide a tire tread base rubber composition having both low hysteresis and high stiffness characteristics together with a low stiffness variation characteristic for various strain or stress intensity histories. By the term "stress intensity history" is meant herein to be "the maximum stress intensity seen by the tread base during a representative period of time".

By the term "low stiffness variation" it is meant that "the dynamic stiffness of the tread base rubber composition does not change appreciably over a reasonable period of time and after typical strain histories". Such dynamic stiffness can be represented, for example, by shear complex modulus $G^*$, and other resultant viscoelastic properties such as loss modulus $G''$ and tangent delta values, taken at about 60° C.

In practice, for the tire tread of this invention, it is intended that the shear complex modulus $G^*$ of the tire tread base composition does not vary more than about 15 percent, preferably not more than ten percent, for the normal useful life of the tire.

Conventional analytical apparatus, or equipment, is used for measuring elastic modulus $G^*$, loss modulus $G''$ and tangent delta values of rubber compositions and the use and application of such apparatus for determining such values for rubber compositions is believed to be well known to those skilled in such rubber composition analytical art.

In practice, it is considered herein to be important to use tire tread base rubber compositions which have relatively stable rubber properties such as, for example, the aforesaid relatively high stiffness and relatively low hysteresis properties during the expected useful life of the tire under typical operating conditions. Thus, it is desired herein to provide such a tread base composition having a relatively low stiffness variation, or softness.

This is considered important because variations of the tire tread base, or undertread, properties such as stiffness and hysteresis during the expected useful life of the tire under typical operating conditions and solicitations of the tire tread will conventionally be expected to result in a drop, or reduction, in tire performance characteristics. For example, the tire's rolling resistance which may increase, thus, increasing vehicular fuel consumption, the tire's handling performance such as cornering may decrease, as well as the tire's high speed performance may decrease.

For example, and as a measure of heat resistance in terms of heat build-up, a blow-out test of the tread base rubber composition may be used to show an advantage of using the rubber composition of this invention for lower heat generation capabilities. The term "blowout" relates to a test which can briefly be described as being conducted by DIN Method No. 53533 with a Goodrich flexometer and is well known to those having skill in such art.

The blow-out test involves subjecting a rubber sample of definite size and shape to high frequency oscillating compressive stresses under controlled conditions. The temperature is measured versus time required for fatigue failure of the sample by internal rupture or blow-out.

In the description of this invention, the term "phr" where used herein, and according to conventional practice, refers to "parts of a respective material per 100 parts by weight or rubber, or elastomer".

In the description of this invention, the terms "rubber" and "elastomer", where used herein unless otherwise prescribed, are used interchangeably. The terms "rubber composition", "compounded rubber" and "rubber compound" where used herein unless otherwise prescribed, are used interchangeably to refer to "rubber which has been blended or mixed with various ingredients or materials" and such terms are well known to those having skill in the rubber mixing, or rubber compounding, art.

The Tg of a polymer, particularly an elastomer, if used herein unless otherwise prescribed, refers to its glass transition temperature which can conventionally be determined, for example, by a differential scanning calorimeter at a heating rate of, for example, about 20° C., to an observed transition of the temperature versus time curve. It is understood that such Tg determination is well known to those having skill in such art.

SUMMARY AND PRACTICE OF THE INVENTION

In accordance with this invention, a pneumatic tire is provided having a rubber tread of cap/base construction and composed of a rubber tread cap designed to be ground-contacting and a rubber tread base underlying said tread cap and designed, or intended, to not be ground-contacting wherein (A) said tread base is polyphased composition comprised of (i) 100 parts by weight of at least one diene based elastomer and (ii) about 5 to about 80, alternatively about 10 to about 60, parts by weight (phr) of a micro inclusion therein as a dispersion of particles within one or more of said elastomer(s) of at least one particulate, ultra high molecular weight, thermoplastic polymer having a molecular weight in a range of about one to about seven, alternatively about three to about five, million and a softening point in a range of about 110° C. to about 180° C. and (iii) about 20 to about 100 phr of reinforcing fillers selected from carbon black and silica; and (B) said tread cap is comprised of at least one diene based elastomer and is exclusive of said thermoplastic polymer.

In accordance with this invention a method of preparing a tire having a rubber tread of cap/base construction is provided, which comprises applying a sulfur vulcanizable rubber tread of cap/base construction, with the tread cap designed to be road-contacting and the tread base underlying said tread cap, circumferentially around an outer, sulfur vulcanizable, rubber surface of a toroidal shaped tire carcass to form an assembly thereof, with said tread base contacting and juxtapositioned against said surface of said carcass, and vulcanizing the assembly under conditions of elevated temperature in a range of about 140° C. to about 160° C.; wherein (A) said tread base is a polyphased composition, a particulate, ultra high molecular weight thermoplastic polyethylene polymer is mixed with at least one diene based elastomer and reinforcing fillers to a temperature in a range of about 120° C. to about 190° C. and at least 10° C. above the softening point of said polyethylene polymer to prepare said polyphased composition, wherein said polyphased composition is comprised of (i) 100 parts by weight of said diene based elastomer and (ii) about 10 to about 60 phr of a micro inclusion therein as a dispersion of particles within one or more of said elastomer(s) of said particulate, ultra high molecular weight, thermoplastic polyethylene polymer, said polyethylene polymer having a molecular weight in a range of about two to about five million, a particle size in a range of about 10 to about 150 microns and a softening point in a range of about 110° C. to about 180° C., [and] (iii) about 35 to about 90 phr of said reinforcing fillers, said reinforcing fillers comprised of both carbon black and silica and (iv) a silica coupler; and (B) said tread cap is comprised of at least one diene based elastomer and is exclusive of said thermoplastic polymer.

By the term "diene based elastomer" for the tread cap and for the tread base it is meant that "the elastomer have a diene origin or content, whether it be a natural or synthetic elastomer and, therefore, is considered to contain carbon-to-carbon double bonds and to, therefore, be sulfur vulcanizable".

In one aspect, the tread base composition is required to be polyphased in a sense that the particulate thermoplastic polymer(s) of the said micro inclusion dispersion is incompatible with the elastomer(s) of the tread base because the thermoplastic particles remain as a separate phase from the elastomer(s) in a homogeneous mixture, or dispersion, of the particulate thermoplastic polymer(s) in the rubber composition.

By the term "micro inclusion" of the thermoplastic particles into the elastomer composition for the tread base it is meant that "the particles are present as dispersed micro particles", sometimes substantially in a form of spheres, with individual properties such as stiffness and hysteresis being significantly different from the elastomer composition matrix itself.

In practice, the tread cap rubber composition may typically contain, for example, about 20 to about 100 phr and the tread base rubber composition typically and preferably contains about 35 to about 90 phr, of at least one reinforcing filler selected from carbon black and silica, if silica is used.

The term "matrix" is intended to mean "the rubber composition phase which surrounds the aforesaid micro inclusions".

Thermoplastic particles for the micro inclusion typically have a softening point, according to ISO Method No. 306, in a range of about 110° C. to about 180° C. and, thus, may soften at a temperature above or below the typical processing, or mixing, temperature range of about 140° C. to about 190° C. for the preparation of the elastomer composition itself.

However, such thermoplastic particles for the micro inclusion have very high molecular weights which have a significantly higher viscosity than the matrix when reaching their melting points, even when the processing temperature is above the softening point of the thermoplastic polymer, it is considered herein that any deformation of the polymer is relatively minimal in nature so that the particles keep their particulate nature.

Therefore, it is considered herein that the particles remain as independent particles within the elastomer composition and as unvulcanized domains within the elastomer composition when it is sulfur vulcanized under conditions of elevated temperature in a range of about 150° C. to about 190° C.

It is believed herein that the aforesaid inclusions of thermoplastic particles into the elastomer composition for the tire tread base may satisfy specific composite laws. By the term "specific composite laws" it is meant "micro-macro theories where, as a function of the individual phase properties (here: the micro inclusion and the matrix phases), the macroscopic properties of the polyphased composition can be monitored, or controlled". Representative macroscopic properties are, for example, complex modulus, and loss modulus at various strains. The dynamic property such as, for example, complex stiffness, of the micro phase might be controlled such as, for example, by (i) selecting various grades of thermoplastic materials such as, for example, several samples of a thermoplastic material with varying melting points, for the included dispersion phase which result in variations in the overall polyphased composition's stiffness as a function of temperature and then (ii) selecting specific thermoplastic samples with specific melting points in order to control, or achieve, a desired stiffness variation with temperature of the polyphased composition. In addition, the macroscopic properties of the polyphased composition might be monitored, or achieved, for example, by adjusting the volume fraction, stiffness and shape factor of the micro inclusions of the thermoplastic material.

In the case of the rubber composition containing the inclusion of dispersed thermoplastic particles, the thermoplastic particles may be considered as being the micro phase.

A tuning, or adjusting, of the macroscopic properties of the tire tread base rubber composition is considered herein to be possible by controlling the local internal stresses developed in each constituent, namely, the micro inclusion of the particulate thermoplastic polymer constituent in the macro phase of the rubber matrix constituent, of the tire tread base rubber composition. A degree of control of the local internal stresses, or local stresses developed in the micro inclusions and the matrix, can be accomplished by varying the volume fraction of micro inclusions, the stiffness ratio of the matrix to micro inclusions as well as the shape of the thermoplastic particles themselves.

The aforesaid local internal stresses might be estimated, for example, by using specific self-consistent theories well known to those having skill in such field. An example of such theory can be found in the following literature reference: *Thermomechanical Behavior of Metal Matrix Composites, General Theory and Self-Consistent Approach*, F. Corvasce, P. Lipinski and M. Berveiller, pages 431–514, JNC6 Oct. 11–13, Paris, 6th National Congress on the composites.

In one aspect, it has been observed that a polyphased rubber composition, composed of the rubber matrix phase and the thermoplastic polymer micro inclusion phase, having both a relatively high stiffness property and a relatively low stiffness variation, or softening, property can be obtained. By the term "polyphased" it is simply meant that "a material is composed of at least two distinct physical phases", for example, the aforesaid rubber matrix phase and the micro inclusion phase. It is believed this terminology is acceptable and is well known to those skilled in such art.

This aspect is particularly desirable for the tire tread base in order to promote a substantial maintenance of its mechanical properties over a major portion of the useful life of the tire such as, for example, complex modulus, loss modulus and tangent delta (Tan Delta), all terms well known to those skilled in such art, independently of the tire tread's, solicitations history.

Accordingly, for the tire tread of this invention of a cap/base construction, it is desired that the tread base have a low stiffness variation as measured by sheer complex modulus G* at 60° C. of not more than 15, preferably not more than 10, percent over a reasonable, normal, useful life of the tire.

Thus, in accordance with this invention, it is considered advantageous to provide a tire with a tread of a cap/base construction which uses a rubber composition for the tread base which contains a dispersion of micro inclusions of the ultra high molecular weight thermoplastic particles.

In the practice of this invention, the aforesaid particulate thermoplastic polymer for the micro inclusion into the elastomer composition can be of various compositions such as, for example, ultra high molecular weight polyethylene and/or polypropylene. The molecular weights of the thermoplastic, yet somewhat crystalline, polymers are at least one million and can be as high, for example, as seven million (weight average molecular weight). Thus, a molecular weight in a range of about one to about seven, alternatively about three to five, million is contemplated for the practice of this invention.

In particular, it is considered herein that such polymers are thermoplastic although they may contain some degree of crystallinity in a form, for example, of crystallites within the thermoplastic polymer itself.

In the further practice of this invention such particulate thermoplastic polymer(s) desirably have a particle size in a range of about 10 to about 150 microns.

Further, the low specific gravity of crystalline polyolefin thermoplastics such as the ultra high molecular weight polyethylene within a range of about 0.9 to about 1.0 g/cm$^3$ allows a consideration of such polymer for development of relatively light rubber compositions. Low specific gravity rubber compositions contemplated for one aspect of the practice of this invention may be, for example, in a range of about 0.95 to 1.1 g/cm$^3$ as compared to a typical carbon black reinforced rubber composition having a specific gravity in a range of about 1.1 to about 1.2 g/cm$^3$.

Accordingly, in one aspect of this invention, a process and resulting product is provided such as, for example, a method of preparing a tire, of reducing the specific gravity of a rubber composition having a specific gravity greater than 1.0 and comprised of at least one diene-based elastomer together with conventional compounding ingredients such as a tread base rubber composition, which comprises dispersing within said rubber composition about 10 to about 70 phr of independent particles as a micro inclusion in said elastomer(s) of at least one particulate, ultra high molecular weight, thermoplastic polymer having a molecular weight in a range of about one to about seven million, alternatively about two to about five million, a softening point in a range of about 110° C. to about 180° C. and a specific gravity in a range of about 0.9 to about 0.98.

It is recognized that tire treads have been previously suggested in U.S. Pat. No. 4,675,349 with a tread cap designed to contact the road containing 2–20 phr high density polyethylene having a softening point above 135° C. where the high density polyethylene is mixed with the rubber at 93° C. to 116° C. with the mixing temperature "being insufficient to significantly alter the size and shape of the polyethylene particles . . . " (column 6, lines 32–34). However, it is considered that this invention is significantly differentiated therefrom because, in one aspect, it is considered herein that the required ultra high molecular weight polyethylene, as herein discussed, is sufficiently viscous at its' melt point that it substantially maintains much of its size and shape. Further, it is believed that interfacial adhesion between the ultra high molecular weight polyethylene used in this invention is a significant contribution to the relatively low stiffness varying of the polymer compositions of this invention. Further, it is recognized that, in U.S. Pat. No. 5,341,863, tire treads have been suggested which contain a minor amount (2.5–20 phr) of low density polyethylene (LDPE) having a crystalline melt point of about 104° C. to 115° C., wherein the LDPE is mixed with unvulcanized rubber at a temperature of about 120° C. to 170° C. Clearly, such LDPE is not the ultra high molecular weight polyethylene required by this invention.

It is desired, for the tread base rubber composition of this invention, to provide a relatively high stiffness rubber composition with relatively low stiffness breakdown using the concept of hard, thermoplastic, inclusions dispersed within a soft rubber composition, the rubber matrix must have a relatively low stiffness breakdown as compared to various strain histories.

By the term "strain histories", as hereinbefore referenced, it is meant "the various maximum strain amplitudes" which are terms believed to be well known by those skilled in such art.

The dynamic and static compound properties, such as, for example, complex modulus, tensile curves (stress versus strain), loss modulus and tangent delta properties, can be determined before and after various cyclic strains. The change in dynamic properties before and after cycling are demonstrative of the compound property stabilities and, thus, the relatively low stiffness variation, or softness, over time.

By controlling the amount of particulate thermoplastic polymer inclusion in the rubber composition versus the stiffness ratio of the thermoplastic polymer inclusion versus the matrix of the rubber composition, the local strain amplitude in each phase (rubber composition matrix phase and thermoplastic particle dispersed inclusion phase) can be controlled, or modified. The soft rubber matrix is considered herein to contribute to large strain values, or strains of large amplitudes, and the micro inclusions of the aforesaid ultra high molecular weight thermoplastic polymer(s) are considered herein to provide reinforcement for the tread base rubber composition.

This phenomenon provides an opportunity to utilize specific tuning, or adjustment, of the tread base rubber matrix composition's non-linear properties such as, for example, stress-strain properties such as tensile and loss modulus properties of the rubber composition vulcanizates, as well as a reduction of stiffness softening and permanent set of the polyphased rubber composition as compared to various strain histories.

In practice, the tread cap rubber portion, and possibly the tread base portion, of the tread construction may be composed of various diene based elastomers such as, for example, homopolymers of conjugated dienes such as, for example, 1,3-butadiene or isoprene or copolymers of 1,3-butadiene and isoprene or of 1,3-butadiene and/or isoprene and an aromatic vinyl compound such as styrene or alphamethylstyrene.

Representative examples of such diene based elastomers are homopolymers and copolymers of conjugated dienes such as, for example, isoprene and 1,3-butadiene, and copolymers of conjugated dienes and a vinyl aromatic compound such as, for example, styrene and alphamethylstyrene. Representative of such elastomers are, for example, natural or synthetic cis 1,4-polyisoprene, cis 1,4-polybutadiene as a polymer or 1,3-butadiene monomer, isoprene/butadiene copolymers, styrene/butadiene copolymers, styrene/isoprene copolymers, styrene/isoprene/butadiene terpolymers, medium vinyl polybutadiene polymers having a vinyl content in a range of about 30 to about 50, high vinyl polybutadiene polymers having a vinyl content in a range of about 50 to about 90 percent.

The tread base rubber portion of the tire tread construction, might be composed of elastomers typically selected from one or more of natural cis 1,4-polyisoprene rubber, blends of the natural rubber with styrene/butadiene copolymer rubber or mixture of various diene-based elastomers as hereinbefore described. Often, a major portion of the tread base rubber, sometimes at least about 50 percent of the elastomers, is cis 1,4-polyisoprene and, in some instances, the tread base rubber might be entirely cis 1,4-polyisoprene rubber which might be natural cis 1,4-polyisoprene rubber.

In practice, the tire tread of cap/base construction may be created, for example, by co-extruding the tread cap and tread base together through a singular die to form the extruded tread construction. The individual compounded rubber compositions, one composition for the tread cap and one composition for the tread base, are simultaneously extruded through a single die at a temperature in a range, for example, of about 100° C. to about 125° C., typically about 110° C. and, thus, is considered as being a relatively hot extrusion process, although such actual extrusion temperatures themselves are considered normal for a rubber extrusion process. The extruded tread stock is then built onto a rubber tire carcass to create an assembly thereof. The assembly is then vulcanized, or cured, at an elevated temperature. Such overall process is well known to those skilled in such art. In this manner then, by the aforesaid co-extrusion process and the covulcanization of the tread cap and tread base, the tread cap and tread base are considered herein to be an integral, cooperative, unit of the tire.

Thus, in the practice of this invention, a tire tread of a cap/base construction is provided which relies upon cooperative tread cap and tread base constructions for a tire tread intended to be capable of utilization for passenger tires, truck tires and aircraft tires.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, silica and carbon black. As known to those skilled in the art, depending on the intended use of the sulfur vulcanizable and sulfur vulcanized material (rubbers), the additives mentioned above are selected and commonly used in conventional amounts.

Reinforcing fillers for the elastomer compositions may be, for example, carbon black, typically of, for example, the N-110, N-220, and low to high surface and structure classifications generally, and also sometimes silica, typically precipitated silica, or a combination of carbon black and silica. An exemplary reinforcing filler content for the elastomer compositions is a range of about 35 to about 100 phr and the amount and choice of reinforcing filler used will be up to the practitioner, depending somewhat upon the degree and extent of reinforcement desired. Often, a silica coupler is used for the silica reinforcement in order to enhance its reinforcement of the elastomer(s). Such use of silica couplers is well known to those skilled in such art.

Typical amounts of tackifier resins, if used, comprise about 0.5 to about 10 phr, usually about 1 to about 5 phr. Typical amounts of processing aids comprise about 1 to about 20 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 4 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, with a range of from about one to about 2.5, being preferred.

Accelerators are used to control the time and/or temperature required for vulcanization and to improve the properties of the vulcanizate. Retarders are also used to control the vulcanization rate.

In one embodiment, a single accelerator system may be used, i.e., primary accelerator. Conventionally and preferably, a primary accelerator(s) is used in total amounts ranging from about 0.5 to about 4, preferably about 0.8 to about 2.5, phr. In another embodiment, combinations of a primary and a secondary accelerator might be used, with the secondary accelerator being used in amounts of about 0.05 to about 3 phr, for example, in order to activate and to improve the properties of the vulcanizate. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the use of silica as a reinforcing filler in combination with a coupling agent in a prescribed rubber blend.

The presence and relative amounts of the above additives are not considered to be an aspect, except as may hereinbefore be set forth, of the present invention which is more primarily directed to the tire with cap/base construction in which the tread base contains a micro inclusion of a dispersion of one or more ultra high molecular weight particulate thermoplastic polymers.

The tire can be built, shaped, molded and cured by various methods which will be readily apparent to those having skill in such art.

The invention may be better understood by reference to the following examples in which the parts and percentages are by weight unless otherwise indicated.

EXAMPLE I

Natural cis 1,4-polyisoprene rubber compositions were prepared containing micro inclusions of ultra high molecular weight polyethylene particles compositions and referred to herein as Samples B and C.

A control rubber composition was also prepared of the natural rubber, but without the aforesaid micro inclusions and referred to herein as Sample A.

The rubber compositions were prepared by mixing the ingredients in two sequential non-productive mixing stages (without the curatives) for about two minutes to a temperature of about 165° C. followed by a final productive mixing stage (basically for addition of the curatives) for about two minutes to a temperature of about 110° C.

The resulting compositions were cured under conditions of elevated temperature and pressure, namely, for about 18 minutes at about 150° C.

The ultra high molecular weight polyethylene particles, having a softening point of about 132° C., and the rubber composition were mixed in the initial two internal mixers to a temperature of about 165° C. Accordingly, it is concluded herein that the particles of the ultra high molecular weight polyethylene softened somewhat during the rubber mixing process and were homogeneously dispersed within the rubber matrix as micro inclusions. Thereby, a polyphased rubber composition was created which was composed of the rubber matrix phase as the major phase and the thermoplastic, particulate, micro inclusion minor phase dispersed within the rubber matrix phase.

Due to the high molecular weight of the thermoplastic polymer and its apparently associated very high viscosity upon melting, its particles substantially retain their individual identity and perhaps even much of their overall size and shape even during the elastomer mixing at temperatures above the softening point temperature of the thermoplastic polymer.

It is to be appreciated that the ultra high molecular weight polyethylene micro inclusion phase remains as unvulcanized particles within the rubber matrix during the sulfur vulcanization, or curing, of the sulfur vulcanizable, natural rubber phase.

The rubber compositions were comprised of the ingredients illustrated in Table 1. The values, for the most part, are simply rounded to the nearest whole number.

TABLE 1

| Sample # | A | B | C |
|---|---|---|---|
| Non-Productive Mix Stages | | | |
| Natural rubber[1] | 100 | 100 | 100 |
| Thermoplastic polymer[2] | 0 | 20 | 0 |
| Carbon Black[3] | 2 | 28 | 50 |
| Processing oil, aromatic | 2 | 2 | 5 |
| Fatty Acid | 1 | 1 | 3.5 |
| Silica[4] | 16.5 | 16.5 | 15 |
| Coupling Agent[5] | 3 | 3 | 3 |
| Productive Mix Stage | | | |
| Zinc Oxide | 10 | 10 | 6 |
| Antioxidants[6] | 1 | 1 | 1 |
| Sulfur | 6 | 6 | 4 |
| Sulfenamide Type Accelerators | 0.8 | 0.8 | 2 |

[1]Cis 1,4-polyisoprene natural rubber;
[2]A particulate thermoplastic polymer obtained as Stamylan VHG-10 from the DSM company. The thermoplastic polymer was, reportedly, an ultra high molecular weight polyethylene having a softening point according to ISO Test No. 306 of about 132° C., an average particle size of about 125 microns and a molecular weight (weight average) of about three to about five million;
[3]N-550 carbon black;
[4]Silica obtained as VN2 from the Degussa company;
[5]Obtained as a 50/50 composition of bis-3-(triethoxysilylpropyl) tetrasulfide and N330 carbon black commercially available as X50S from Degussa as a 50/50 blend of the tetrasulfide with N330 carbon black (thus, considered 50% active); technically, the tetrasulfide is believed to be an organosilane polysulfide as a composite, or mixture, having an average number of sulfur atoms in a polysulfide bridge in a range of about 3.5 to about 4 connecting sulfur atoms, although the composite, or mixture may contain individual organosilane polysulfides with about 2 to about 8 connecting sulfur atoms;
[6]Of the diarylparaphenylene diamine type.

EXAMPLE II

The cured rubber compositions from Example I were then tested to obtain physical properties of the rubber compositions and reported in the following Table 2 which were then used to predict properties of a tire with a tread of a cap/base construction.

TABLE 2

| Sample # | A | B | C |
|---|---|---|---|
| 100% Modulus (MPa) | 1.7 | 3.5 | 4.5 |
| Tensile Strength (MPa) | 21.2 | 18.5 | 16 |
| Elongation (%) | 560 | 460 | 305 |
| Hardness, Shore A | 57 | 66 | 70 |
| Rebound (100° C.) | 81 | 78 | 79 |
| G' (A) @ 60° C. (MPa) | 1.7 | 2.3 | 2.3 |
| G' (B) @ 60° C. (MPa) | 1.7 | 2.2 | 1.8 |
| Tan. Delta (A) @ 60° C. | 0.05 | 0.05 | 0.08 |
| Tan. Delta (B) @ 60° C. | 0.05 | 0.06 | 0.12 |

Note:
1) Both the tan. delta (A) and G' (A) were initial tests taken at 2 percent shear strain (stress in terms of MPa at two percent elongation);
2) Both the tan. delta (B) and the E' (B) were taken after pre-cycling the rubber compositions at a 10 percent shear-strain for about 10 minutes at about 10 Hz.

The storage modulus of the rubber composition is referred to in Table 2 as G'. The storage modulus reported in Table 2 for Sample B compared to Sample C shows that the stiffness of the rubber compositions are initially similar but remain more stable with Sample B after a pre-cycle strain as evidenced by storage modulus G' (A) and storage modulus G' (B). This is considered herein to be significant because this is considered herein to lead to low rubber composition stiffness variation as a tire tread base rubber composition with tire solicitation history.

The tangent delta (tan. delta) properties reported in Table 2 for Sample B as compared to Sample C shows that the hysteresis is more stable for Sample B as evidenced by increase in tan. delta from Sample A to Sample B. This is considered herein as being significant because the rubber composition's hysteresis is varying, thus, leading to possible tire rolling resistance variations and local increased heat build-up.

The tan. delta is considered as being predictive of hysteresis of a rubber compound. A higher tan. delta value is predictive of a higher hysteresis.

The tan. delta property reported in Table 2 for Sample B as compared to Sample A shows that the tan. delta remained relatively constant for a significant increase in the stiffness of the rubber composition for Sample B. This is considered herein be significant because this shows a high potential for low hysteresis rubber composition development.

The storage modulus property is reported in Table 2 as G'. The storage modulus is indicative of the compound stiffness. The storage modulus for Sample B as compared to Sample A shows that the stiffness of the rubber composition can be improved by using the very high molecular weight polyethylene particles without having the stiffness-softening of the rubber composition observed for Sample C.

Therefore, it can be concluded that the use of the inclusion of the particulate polymer into the rubber composition matrix can be used to form a relatively stiff, low hysteresis, rubber composition which also has a relatively low stiffness-softening property. This is considered to be a significant and important aspect of the invention because tire components are submitted to various strain or stress solicitations during the tire life.

For the tensile elongation and 300% modulus values tests, reference may be made to ASTM Test D412-92, method B.

For the rebound tests, reference may be made to DIN 53512.

For the hardness, Shore A test, reference may be made to ASTM 2240-91 and may be determined at room temperature, or about 23° C.

For the G' values, which are sometimes referred to as "the shear storage modulus", reference may be made to *Science and Technology of Rubber, second edition,* 1994, Academic Press, San Diego, Calif., edited by James E. Mark et al, pages 249–254. The use of the storage modulus (E') to characterize rubber compositions is well known to those having skill in such art.

These properties, namely the G', G" and tan. delta, characterize the viscoelastic response of a rubber test sample to a shear strain at a fixed frequency and temperature, most often measured at 0° C. and 60° C.

The tan. delta and shear storage modulus (G') are well known to those skilled in the rubber composition characterization art, particularly as it relates to tires and tire tread rubber compositions. The shear storage modulus (G') values were determined before and after (the G' (A) and the G' (B) values) pre-cycling at 10 percent sheer strain. The G' values are indicative of rubber composition stiffness stability. The tan. delta value at 60° C. before and after pre-cycling at 10 percent shear is indicative of a hysteresis change with strain history.

Therefore, the benefit of having the micro inclusion of the dispersion of the thermoplastic particles in the elastomer matrix of the base can be expressed as a way to achieve a stiff rubber composition with stable dynamic properties such as, for example, storage modulus, loss modulus and tangent delta. This is considered herein as being a particular benefit because vehicular handling and steering and the stability in negotiating curves in the road for the tire should not vary much during the ordinary useful life of the tire.

Accordingly, it is considered herein that rubber composition properties of the tire tread cap rubber taken together with tire base composition B, particularly when compared with comparative control tire base composition A, are predictive that a tire tread cap/base tread construction, utilizing the tread base composition of this invention, will provide a tire with relatively enhanced (i) handling property as evidenced by the higher G' values for the tread base composition and (ii) steering and stability properties as evidenced by the maintained higher G' value and equal tan. delta values for the tread base composition after higher shear strain solicitations.

Therefore, it is concluded that the polyphased composition of this invention with the micro inclusion of the particulate ultra high molecular weight polyethylene within the rubber matrix provided the following benefit, insofar as the rubber composition properties are concerned: low permanent set hysteresis, stable rubber composition stiffness and hysteresis versus various strain histories.

EXAMPLE III

Tires of size 195/65R15 were prepared with a tread of cap/base construction, with the tread cap being designed to be ground-contacting and the tread base located beneath the tread cap and between the tread cap and the supporting tire carcass.

All of the tires had the same rubber tread cap and the same supporting reinforced rubber carcass.

Tire A has a tread base of the rubber of composition of Sample A in Example I is therefor considered as a control, and is referred to herein as Tire A.

Tires B and C each individually had a tread base of Sample B and of Sample C of Example I and are referred to herein as Tire B and Tire C, respectively.

The tires were tested and the results are reported in the following Table 3.

The results for the Control Tire A were normalized to a value of 100 and the values of test tires B and C are reported herein comparatively to the normalized values for the Control Tire A.

TABLE 3

| Tire No. | A | B | C |
|---|---|---|---|
| Stability | 100 | 112 | 90 |
| Handling | 100 | 107 | 77 |
| Steering (0°) | 100 | 105 | 85 |

The Stability and Handling test values for Tire B, as compared to the corresponding test values for Tire C, shows that the tire with a tread base rubber composition with the low stiffness variation, or stiffness softening, property namely, Tire B, demonstrated improved stability and handling properties, as represented in the above Table 3, as compared to Tire A which had a tread base without the rubber composition having the low stiffness variation, or softening, property. This is considered herein to be significant because low stiffness softening rubber compositions should also have a sufficient stiffness in order to provide tire handling properties improvement.

The steering (0°) test value for Tire B as compared to the corresponding test value for Tire C shows that the tire with tread base rubber composition with the low stiffness variation, or softening, property namely, Tire B, has a low tan. delta value which its relatively low variation versus strain history has provided a tire with a comparatively low steering response time. This is considered herein to be significant because it shows that low tan. delta rubber compositions with relatively high stiffness can be developed.

Therefore, it is considered herein that a tire of a cap/base construction can be provided with a tread base of a polyphased composition of the rubber composition matrix as a major component, with the micro inclusion of the particulate ultra high molecular weight polyethylene as a minor component, to provide an enhancement of the tire's handling properties.

Indeed it is considered herein that the cooperative combination of the outer tread cap and underlying polyphased tread base composition which contains the aforesaid micro inclusion can provide a benefit of lower hysteresis, an improvement in handling, lower internal heat generation and a comparatively substantially maintained tire tread footprint for the overall tread under various operating conditions, namely, running the tire under load.

The stability test for the tires is conducted by a driver of an automobile on which the test tire(s) is (are) mounted. The automobile is driven over a road under various conditions administered by the driver, including various direction changes. The tire's response precision under the various driving conditions is measured.

This test is considered herein to be demonstrative of the tire's response stability.

The handling test for the tires is conducted by mounting the test tire(s) on the wheel(s) of an automobile and the automobile being driven by a driver over a road or track and the handling results reported by the driver as a subjective evaluation. This test is considered herein to be demonstrative of the tire response in curve or for direction change.

The steering (0°) test for the tires is conducted by a driver of an automobile on which the test tire(s) is (are) mounted over a road, or track, around a zero degree angle input provided by the driver. This test is considered herein to be demonstrative of the steering precision, or tire response time, around the zero degree angle.

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing a tire having a rubber tread of cap/base construction, which comprises applying a sulfur vulcanizable rubber tread of cap/base construction, with the tread cap designed to be road-contacting and the tread base underlying said tread cap, circumferentially around an outer, sulfur vulcanizable, rubber surface of a toroidal shaped tire carcass to form an assembly thereof, with said tread base contacting and juxtapositioned against said surface of said carcass, and vulcanizing the assembly under conditions of elevated temperature in a range of about 140° C. to about 160° C.; wherein (A) said tread base is a polyphased composition, a particulate, ultra high molecular weight thermoplastic polyethylene polymer is mixed with at least one diene based elastomer and reinforcing fillers to a temperature in a range of about 120° C. to about 190° C. and at least 10° C. above the softening point of said polyethylene polymer to prepare said polyphased composition, wherein said polyphased composition is comprised of (i) 100 parts by weight of said diene based elastomer and (ii) about 10 to about 60 phr of a micro inclusion therein as a dispersion of particles within one or more of said elastomer(s) of said particulate, ultra high molecular weight, thermoplastic polyethylene polymer, said polyethylene polymer having a molecular weight in a range of about two to about five million, a particle size in a range of about 10 to about 150 microns and a softening point in a range of about 110° C. to about 180° C., (iii) about 35 to about 90 phr of said reinforcing fillers, said reinforcing fillers comprised of both carbon black and silica and (iv) a silica coupler; and (B) said tread cap is comprised of at least one diene based elastomer and is exclusive of said thermoplastic polymer.

2. The method of claim 1 wherein said silica coupler is a bis-3-(triethoxysilylpropyl) polysulfide with the number of sulfur atoms in the polysulfide bridge in a range of about 2 to about 8.

* * * * *